United States Patent
Takae et al.

(10) Patent No.: US 6,795,703 B2
(45) Date of Patent: Sep. 21, 2004

(54) SYSTEM AND METHOD FOR UPGRADING MOBILE HANDSET

(75) Inventors: Naohito Takae, Kawasaki (JP); Hiroyuki Tani, Hokkaido (JP); Mamoru Mitsuhashi, Aomori (JP)

(73) Assignee: Fujitsu Limited, Kawasaki (JP)

( * ) Notice: Subject to any disclaimer, the term of this patent is extended or adjusted under 35 U.S.C. 154(b) by 494 days.

(21) Appl. No.: 09/791,846

(22) Filed: Feb. 26, 2001

(65) Prior Publication Data

US 2002/0034940 A1 Mar. 21, 2002

(30) Foreign Application Priority Data

Jul. 27, 2000 (JP) ........................................ 2000-227629

(51) Int. Cl.[7] ................................................ G01S 5/02
(52) U.S. Cl. .................... 455/418; 455/550.1; 455/419; 380/247
(58) Field of Search ................................ 455/418, 419, 455/420, 412.1, 412.2, 413, 414.1, 414.2, 414.3, 424–425, 426.2, 435.1; 380/50, 247, 271

(56) References Cited

U.S. PATENT DOCUMENTS

| | | | |
|---|---|---|---|
| 5,062,132 A | 10/1991 | Yasuda et al. ............... 455/557 |
| 5,117,501 A | 5/1992 | Childress et al. ........... 455/11.1 |
| 5,745,850 A | 4/1998 | Aldermeshian et al. ..... 455/417 |
| 5,839,067 A | 11/1998 | Jonsson .................... 455/432.3 |
| 6,026,293 A | 2/2000 | Osborn ....................... 455/411 |
| 6,122,523 A | 9/2000 | Zicker et al. ................ 455/551 |
| 6,167,253 A | 12/2000 | Farris et al. .............. 455/412.2 |
| 6,195,547 B1 | 2/2001 | Corriveau et al. ........... 455/419 |
| 6,247,142 B1 | 6/2001 | Wong et al. .................... 714/5 |
| 6,285,869 B1 | 9/2001 | Shannon et al. ............. 455/411 |
| 6,321,096 B2 | 11/2001 | Lautenschlager et al. ... 455/461 |
| 6,449,479 B1 | 9/2002 | Sanchez ...................... 455/433 |
| 6,587,684 B1 | 7/2003 | Hsu et al. .................... 455/419 |

OTHER PUBLICATIONS

Abstract of Japanese Publication No. 2001–359160, published Dec. 26, 2001.

Primary Examiner—William Trost
Assistant Examiner—Joseph D Nguyen
(74) Attorney, Agent, or Firm—Staas & Halsey LLP

(57) ABSTRACT

A handset upgrading system and method which permit cellular customers to upgrade their handset without visiting a local telephone store, providing a totally automated upgrade service, including application, delivery, and functional verification of new handsets. A requesting customer applies online for handset upgrade service and receives an application filing number from the system. Upon delivery of a new handset with an upgrade password, the customer calls up the system to request switching to the new handset, during which an ID code retrieving unit obtains from the network the identification code of the mobile handset that the customer is currently using. The request is verified by an upgrade request validation unit, based on the application filing number, upgrade password, reservation record, and identification code of the handset. If the request is validated, a switchover command unit directs a telephone exchange to change its setup. To ensure the result of upgrading, a mail and voice function verification units verify the mail and voice functions of the new handset, using a mail server and an interactive voice response (IVR) system, respectively.

11 Claims, 12 Drawing Sheets

CUSTOMER DATABASE

| SUBSCRIBER CODE | PHONE NO. | SERIAL NO. | SERVICE STATUS | PASSWORD FOR CALL FORWARDING | ... |
|---|---|---|---|---|---|
| K00000001 | 09012345678 | ABCDHMKD01 | IN SERVICE | ABCD | ... |
| K00000002 | 09012341111 | ABCDKKKD03 | CANCELED | 1234 | ... |
| K00000003 | 09012342222 | HMKDSTPO01 | IN SERVICE | AD57 | ... |
| ... | ... | ... | ... | ... | ... |

RESERVATION DATABASE

| APPLICATION FILING NO. | SUBSCRIBER CODE | PHONE NO. | OLD MSIN | NEW MSIN | PASS-WORD | SERIAL NO. | COMPLETION DATE |
|---|---|---|---|---|---|---|---|
| M0101001 | K00000003 | 09012342222 | 1234567 | 4141254 | XABkrc | TMDKD00010 | |
| ⋮ | ⋮ | ⋮ | ⋮ | ⋮ | ⋮ | ⋮ | ⋮ |
| ⋮ | ⋮ | ⋮ | ⋮ | ⋮ | ⋮ | ⋮ | ⋮ |
| ⋮ | ⋮ | ⋮ | ⋮ | ⋮ | ⋮ | ⋮ | ⋮ |

RESERVATION DATABASE

| APPLICATION FILING NO. | SUBSCRIBER CODE | PHONE NO. | OLD MSIN | NEW MSIN | PASS-WORD | SERIAL NO. | COMPLETION DATE | ⋮ |
|---|---|---|---|---|---|---|---|---|
| M0101001 | K00000003 | 09012342222 | 1234567 | 4141254 | XABkrc | TMDKD00010 | 2000-05-10 | ⋮ |
| ⋮ | ⋮ | ⋮ | ⋮ | ⋮ | ⋮ | ⋮ | ⋮ | ⋮ |
| ⋮ | ⋮ | ⋮ | ⋮ | ⋮ | ⋮ | ⋮ | ⋮ | ⋮ |
| ⋮ | ⋮ | ⋮ | ⋮ | ⋮ | ⋮ | ⋮ | ⋮ | ⋮ |

CUSTOMER DATABASE

| SUBSCRIBER CODE | PHONE NO. | SERIAL NO. | SERVICE STATUS | PASSWORD FOR CALL FORWARDING | ...... |
|---|---|---|---|---|---|
| K00000001 | 09012345678 | ABCDHMKD01 | IN SERVICE | ABCD | ... |
| K00000002 | 09012341111 | ABCDKKKD03 | CANCELED | 1234 | ... |
| K00000003 | 09012342222 | TMDKD00010 | IN SERVICE | AD57 | ... |
| ... | ... | ... | ... | ... | ... |

SYSTEM AND METHOD FOR UPGRADING MOBILE HANDSET

BACKGROUND OF THE INVENTION

1. Field of the Invention

The present invention relates to a system and method for upgrading mobile handsets. More particularly, the present invention relates to a system and method which allow a cellular service provider to automatically process a request from a mobile phone user who wishes to change his/her existing handset to another handset.

2. Description of the Related Art

Many cellular service providers offer handset upgrade service to their customers, allowing them to change their current handsets to more up-to-date, feature-rich ones. The demands for such upgrade service have been increasing because of the rapid introduction of new functions and attractive services.

In a conventional service model, people visit their local provider office, dealer, or retail store to apply for an upgrade and purchase a new handset. Typically a salesclerk checks the customer's existing handset, verifies his/her identity, and requests the customer to fill out the application form for an upgrade. The application details are then entered to the provider's system through a dedicated data terminal, thereby causing the telephone exchange to activate a new setup (i.e., register the new handset and deregister the old one). Since the new handset has to inherit the existing phone number, the salesclerk writes it into a read-only memory (ROM) chip on the handset, using a dedicated ROM programming device.

As seen from the above, the conventional procedure requires some special equipment to execute an upgrade. In other words, customers can purchase their desired new handset or obtain upgrade service only in those places where such facilities are available. This limitation in the conventional upgrade service is also justified by the need for the verification test, which has to be performed by a salesclerk having a knowledge of the handset operation. That is, before passing it to the purchaser, the salesclerk checks whether the new handset works fine. In case of any problem with the handset under test, he/she would replace it with another set of the same type.

Still another reason for the limited service availability is that the application must be made by the rightful owner of a handset to be upgraded. Therefore, the applicant shows up in person and authenticates himself/herself by presenting the following things: (a) the handset that is currently used, (b), the knowledge about what are written in the original registration form, and (c) an appropriate identification document (e.g., ID card).

For the above reasons, cellular customers wishing to upgrade their handset are necessitated to present themselves at the sales counter of a telephone store.

SUMMARY OF THE INVENTION

Taking the above into consideration, an object of the present invention is to provide a handset upgrading system and method which eliminate the need for the customers to visit a local store to upgrade their handset, through a totally automated processing mechanism, including delivery and functional verification of new handsets.

To accomplish the above object, according to the present invention, there is provided a handset upgrading system which executes a handset upgrade from a first mobile handset to a second mobile handset for use in a cellular network. This system comprises an upgrade request validation unit and a switchover command unit. The upgrade request validation unit validates a handset upgrade request received from a customer by verifying that the customer is sending the handset upgrade request with the first mobile handset, based on an identification code that indicates which handset the customer is currently using. The identification code is assigned to each mobile handset and transmitted over the cellular network when a call is initiated. The switchover command unit directs a local telephone exchange to deregister the first mobile handset and register the second mobile handset when the upgrade request verification unit has successfully validated the handset upgrade request.

To accomplish the above object, the present invention also provides a method of executing a handset upgrade from a first mobile handset to a second mobile handset for use in a cellular network. This step comprises the following steps: (a) validating a handset upgrade request received from a customer by verifying that the customer is the applicant who applied online for the handset upgrade, as well as that the customer is currently using the first mobile handset, based on an identification code that indicates which handset the customer is currently using, the identification code being transmitted over the cellular network when a call is initiated; (b) commanding a telephone exchange to deregister the first mobile handset and register the second mobile handset when the step (a) of validating has successfully validated the handset upgrade request; (c) verifying functions that the second mobile handset is supposed to provide; and (d) commanding the telephone exchange to deregister the second mobile handset and reregister the first mobile handset when a problem with the functions of the second mobile handset is found at the step (c) of verifying functions.

The above and other objects, features and advantages of the present invention will become apparent from the following description when taken in conjunction with the accompanying drawings which illustrate preferred embodiments of the present invention by way of example.

BRIEF DESCRIPTION OF THE DRAWINGS

FIG. 6 shows a typical structure of a customer database;

FIG. 7 shows a typical structure of a reservation database;

FIG. 9 shows an example of the updated reservation database;

FIG. 11 shows an example of the updated customer database; and

DESCRIPTION OF THE PREFERRED EMBODIMENTS

Preferred embodiments of the present invention will be described below with reference to accompanying documents.

Figure 1:
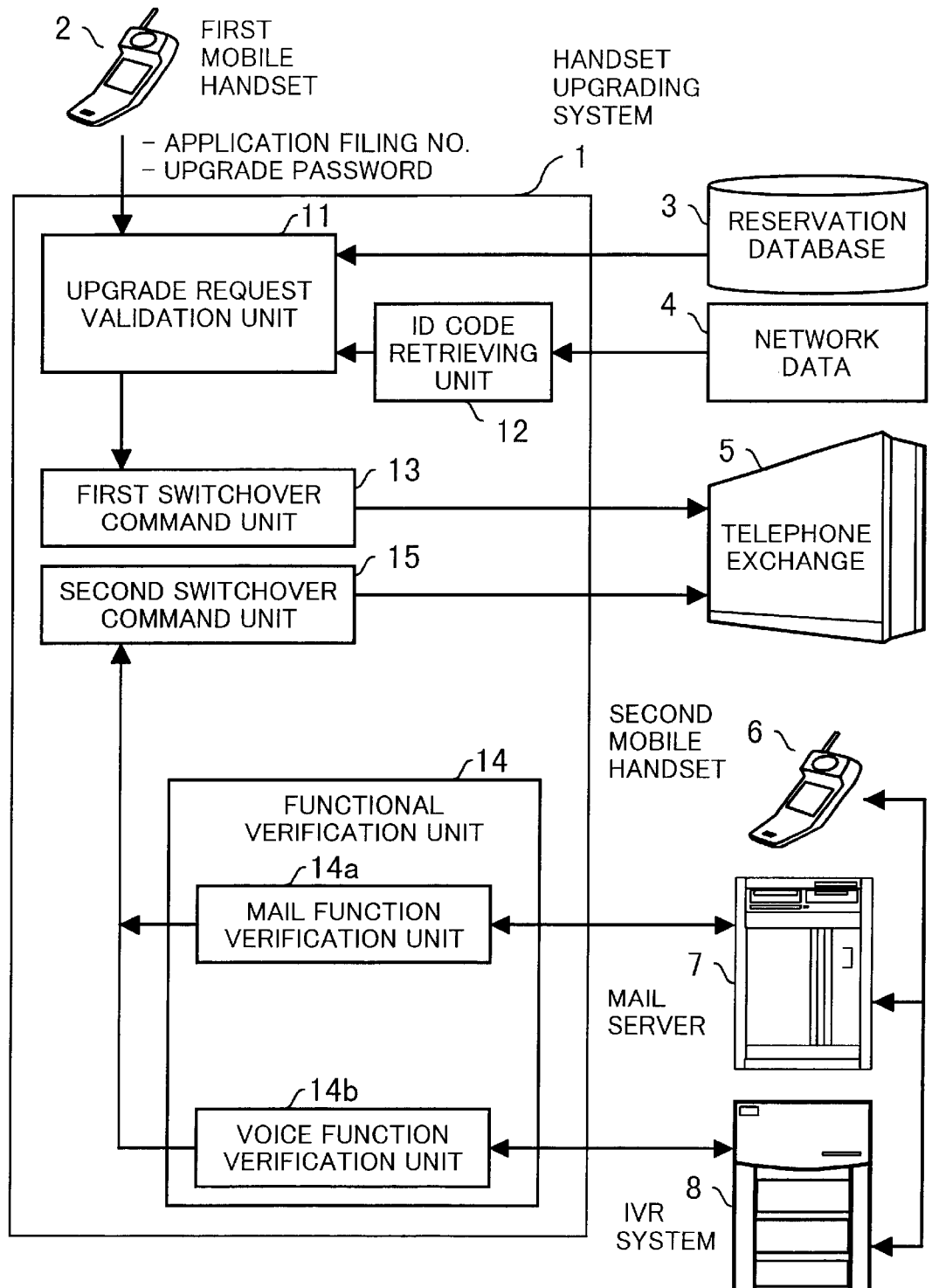
FIG. 1 shows a conceptual view of the present invention.

FIG. 1 shows a conceptual view of a handset upgrading system according to the present invention. This handset upgrading system 1 comprises the following elements: an upgrade request validation unit 11, an ID code retrieving unit 12, a first switchover command unit 13, a functional verification unit 14, and a second switchover command unit 15. The functional verification unit 14 comprises a mail function verification unit 14a and a voice function verification unit 14b.

Briefly, the handset upgrading process proceeds as follows. The cellular customer wishing to upgrade his/her handset to a new type first has to make formal application for an upgrade. When this application is accepted, the service provider creates and saves a relevant reservation record and delivers the desired handset to the requesting customer, together with a certain password that is necessary to activate the new handset. With this password, the customer sends a handset upgrade request to the handset upgrading system 1, in an attempt to initiate switchover from his/her current handset to the new handset. After validating the request, the handset upgrading system 1 directs a relevant telephone exchange to change its setup, so that the new handset will be operable.

Every mobile phone handset is assigned a unique identification code to distinguish itself from others, which is transmitted over the network when a call is initiated. When a handset upgrade request is received from a customer, the upgrade request validation unit 11 examines its associated identification code and other related data to make sure that the request has been transmitted from the first mobile handset 2, which will be obsolete when the upgrade is finished. More specifically, the upgrade request validation unit 11 receives the following information from the customer at this stage: (1) application filing number which was generated and supplied to the customer when he/she applied online for handset upgrading; (2) upgrade password which has been delivered to the customer together with the new handset. The upgrade request validation unit 11 further receives the following information from the reservation database 3: (1) application filing number, (2) upgrade password, (3) handset identification code. The upgrade request validation unit 11 further receives from the ID code retrieving unit 12 the identification code of the handset being used. Using those pieces of information, the upgrade request validation unit 11 proves that the received handset upgrade request is true and correct.

As already mentioned above, the ID code retrieving unit 12 makes access to the network data 4 to obtain the identification code of the first mobile handset 2 that the customer is currently operating. The first switchover command unit 13 directs the telephone exchange 5 to close the service for (or deregister) the current handset 2 and open the service for (or register) the new handset 6, when the upgrade request validation unit 11 has recognized the request in question as being a valid handset upgrade request sent from the first mobile handset 2 of the customer.

The functional verification unit 14 tests whether the switchover operation from the first mobile handset 2 to the second mobile handset 6 has successfully completed, as well as checking whether the second mobile handset 6 is working correctly. More specifically, the mail function verification unit 14a sends a message to the second mobile handset 6 through the mail server 7. This mail message says "We believe your new handset is enabled. Please respond to this mail for acknowledgment." It receives a reply message from the second mobile handset 6, which indicates that the switchover operation has been correctly completed and the e-mail function of the new handset 6 is operable. The voice function verification unit 14b uses an interactive voice response system (IVR system) 8 to send a voice message to the second mobile handset 6 in order to check whether the customer returns any response to that message. As with the mail function verification unit 14a described above, this voice test function is used to prove that the switchover operation has been correctly completed and the voice function of the new handset 6 is operable.

In the event of unsuccessful upgrade, the second switchover command unit 15 would be activated. More specifically, when the functional verification unit 14 finds any problem in the mail and/or voice functions, or when it determines that the upgrade to the second mobile handset 6 is unsuccessful for any reason, the second switchover command unit 15 directs the telephone exchange 5 to resume the service for the first mobile handset 2, while closing that for the second mobile handset 6.

The operation of the above-described handset upgrading system 1 will now be described in greater detail. It is assumed that the customer has already finished his/her application for the upgrade of his/her cellular handset. Note that the present invention allows the customer to make this application online, without the need for visiting a retail store.

The requesting customer notifies the cellular service provider of his/her phone number and the serial number of the first mobile handset 2. In addition to those numbers, the customer sends the password for call forwarding service, which is supposed to be unknown to any other people. With those pieces of information, the cellular service provider authenticates the customer and recognizes that he/she is requesting an upgrade by using the first mobile handset 2. The cellular service provider now accepts the customer's request, thus generating an application filing number and an upgrade password. Besides being sent to the customer, the generated filing number and password are saved into the reservation database 3 for future reference, along with some other information about the first mobile handset 2. After that, the provider makes necessary arrangements for delivery of the specified second mobile handset 6, which involves writing the customer's phone number into the internal ROM chip and printing the upgrade password. The second mobile handset 6 is then shipped to the requesting customer, along with the printout of the upgrade password.

Upon receiving the second mobile handset 6, the customer makes a call to the cellular service provider to submit a handset upgrade request by using the first mobile handset 2. (Note that he/she cannot achieve the purpose with other telephone handsets.) Every call made from a cellular handset causes transmission of its identification code which can never be changed by the user. In the present case, the call to the service provider permits the ID code retrieving unit 12 to obtain the identification code of the first mobile handset 2 from the network data 4.

The customer then enters the application filing number and upgrade password through his/her first mobile handset 2. The upgrade request validation unit 11 receives these values from the customer, along with the handset's identification code from the ID code retrieving unit 12, and compares them with those being stored in the reservation database 3 as a reservation record. Through this comparison, the upgrade request validation unit 11 verifies that the handset upgrade request in question is from an authorized customer who has previously made application for upgrading. If the request is successfully verified by the upgrade request validation unit 11, then the first switchover command unit 13 directs the telephone exchange 5 to activate the second mobile handset 6, while closing the current service for the first mobile handset 2.

Now that the handset switching is done, the mail function verification unit 14a in the functional verification unit 14 sends an e-mail message to the activated second mobile handset 6 through the mail server 7, which notifies the customer of the completion of switchover and prompts him/her to return a reply message to the system for acknowledgment. The customer replies accordingly, causing a message to be transmitted from the second mobile handset 6 back to the mail server 7. From this reply message, the mail function verification unit 14a recognizes that the switchover operation has been correctly completed and the e-mail function of the new handset 6 is working well. If nothing is received within a predetermined period, the mail function verification unit 14a determines that the switchover operation has been unsuccessful, or that the e-mail function of the second mobile handset 6 is inoperable. The mail function verification unit 14a then triggers the second switchover command unit 15, so that the telephone exchange 5 restores the previous setup. That is, the telephone exchange 5 reregister the first mobile handset 2, while deregistering the second mobile handset 6.

In addition to the above, the voice function verification unit 14b directs the IVR system 8 to send a verbal message to the second mobile handset 6 in order to check whether the customer returns any response to that message. If an expected response is returned, the voice function verification unit 14b determines that the switchover operation has been correctly performed and the voice function of the new handset 6 works fine. If there is no response for a predetermined period, or if an unexpected response is received, it determines that the switchover operation was unsuccessful, or the second mobile handset 6 has a problem with its voice functions. If this is the case, the voice function verification unit 14b triggers the second switchover command unit 15, so that the telephone exchange 5 restores the previous setup by reregistering the first mobile handset 2 and deregistering the second mobile handset 6.

As seen from the above description, the present invention permits the cellular users to upgrade their first mobile handset 2 to a second mobile handset 6, without visiting a local telephone store. On behalf of the cellular service provider, the handset upgrading system 1 performs switching to the second mobile handset 6, as well as functional verification for the new setup.

Figure 2:
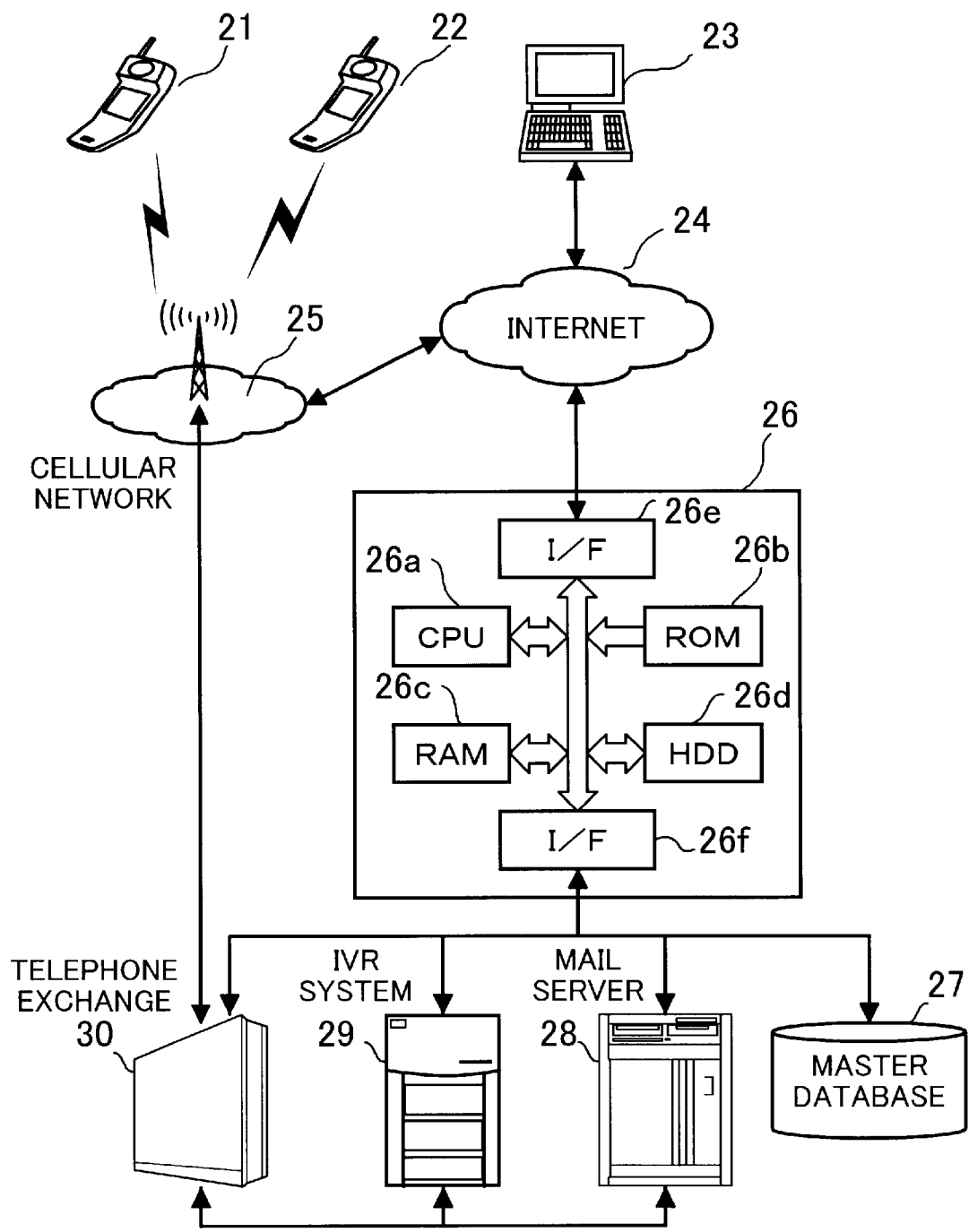
FIG. 2 shows an embodiment of the present invention.

A more specific embodiment of the present invention will be described below with reference to FIG. 2 and other drawings. FIG. 2 is a block diagram of the entire system, which comprises: a current handset 21, a new handset 22, a personal computer 23, the Internet 24, a cellular network 25, a mobile handset upgrading system 26 according to the present invention, a master database 27, a mail server 28, an IVR system 29, and a telephone exchange 30. Among those elements, the handsets 21 and 22 and personal computer 23 are located at the site of a customer who wishes to upgrade his/her mobile handset. The customer can make access to the Internet 24 with the current handset 21, or with the personal computer 23 which is connected to an access network such as a public switched telephone network or cable TV network (both not shown).

The mobile handset upgrading system 26 is constructed on a computer platform comprising the following elements: a central processing unit (CPU) 26a, a read-only memory (ROM) 26b, a random access memory (RAM) 26c, a hard disk drive (HDD) 26d, and interfaces (I/F) 26e and 26f. The CPU 26a performs various operations according to the programs stored in the HDD 26d, besides controlling other parts of the system. The ROM 26b stores basic programs and data that the CPU 26a executes and manipulates. The RAM 26c serves as temporary storage for application programs and scratchpad data that the CPU 26a executes and manipulates at runtime. The HDD 26d stores data to be processed by the CPU 26a, in addition to the control programs therefor. Particularly, in the proposed system, the contents of the HDD 26d include programs for accepting an application for an upgrade, switchover to a new handset, and verifying functions of that handset. The interface 26e supports data format conversion capabilities to enable the CPU 26a to access the Internet 24. The other interface 26f provides the same for the CPU 26a to communicate with the master database 27, mail server 28, IVR system 29, and telephone exchange 30.

The master database 27 is a collection of three sections: "customer database," "reservation database," and "phone number database." The customer database section stores information about individual cellular customers. The reservation database section maintains the records of applications made by the customers. The phone number database section stores phone numbers and mobile subscriber identification numbers (MSINs), which are used to identify a particular mobile subscriber who is making a call with his/her current handset 21. Mobile handsets automatically transmit their MSINs, when they are used, so that they will be uniquely distinguished from each other. While the current handset 21 and new handset 22 are assigned the same phone number temporarily when the former is migrating to the latter, their unique MSINs enable the cellular system to distinguish one from the other. Note here that the MSINs can never be changed by the subscribers.

The mail server 28 provides electronic mail facilities, managing the reception and transmission of message data. The IVR system 29, on the other hand, interacts with a mobile user by sending a verbal message and receiving a response. More specifically, when the user responds to a given message by operating the keypad on his/her handset, a corresponding tone signal is generated, and the IVR system 29 receives and recognizes that particular tone signal and executes a relevant processing routine. The telephone exchange 30 provides circuit switching functions to establish connections among different telecommunications networks, such as the cellular network 25 local to the mobile handsets 21 and 22, other cellular networks operated by different wireless service providers (not shown), and public switched telephone networks (also not shown).

The system illustrated in FIG. 2 operates as follows. Suppose that the owner of an old-type handset 21 wishes to upgrade it to a new-type one 22. There are two ways for this cellular customer to make an online application for handset upgrading. One way is through the current handset 21, and the other way is through his/her personal computer 23. When this application is received, the mobile handset upgrading system 26 checks its details by comparing them with the information stored in the customer database section and phone number database section in the master database 27. If no discrepancy is found, the system 26 accepts the application and issues an application filing number to the customer. It then saves those application details into the master database 27 as a reservation record.

Now that the application is accepted, the cellular service provider makes arrangements for shipment of the specified new handset 22 and generates an upgrade password therefor. The handset 22 and its corresponding password are delivered together to the requesting customer. Upon receipt of the package, the customer makes a request call with the current handset 21 in order to have his/her new handset 22 enabled. At this stage, the customer has to enter his/her application filing number and upgrade password, using the keypad of the current handset 21. When this request call is received, the mobile handset upgrading system 26 refers to the network data associated with the call and recognizes that the customer is requesting an upgrade through his/her current handset 21. The mobile handset upgrading system 26 then checks the validity of the application filing number and upgrade password that the customer has entered. If this check is successfully finished, the mobile handset upgrading system 26 commands the telephone exchange 30 to switch from the current handset 21 to the new handset 22. With the resultant setup, the new handset 22 is activated while the obsolete handset 21 is disabled.

The mobile handset upgrading system 26 then creates an e-mail message addressed to the requesting customer, which solicits him/her for a response. The created message is transmitted toward the new handset 22 via the mail server 28. Upon receiving this message, the customer sends back a reply message for acknowledgment. The mobile handset upgrading system 26 waits for the response, and if there is no reply message received, it directs the telephone exchange 30 to restore the service for the previous handset 21 and deactivate the new handset 22.

If the reply mail is received, the mobile handset upgrading system 26 then attempts to make a voice call to the new handset 22 through the IVR system 29. Prompted by the voice message from the IVR system 29, the customer presses a button on the new handset 22. The IVR system 29 recognizes which button is pressed. If it is exactly what is expected, the mobile handset upgrading system 26 determines that the upgrade has been made correctly and that the new handset 22 is working correctly, thus updating the relevant part of the customer database section in the master database 27. If the IVR system 29 reports that the customer has pressed a different button, the mobile handset upgrading system 26 determines that the new handset 22 has a problem. If this is the case, it directs the telephone exchange 30 to restore the service for the previous handset 21 and deactivate the new handset 22.

Figure 3:
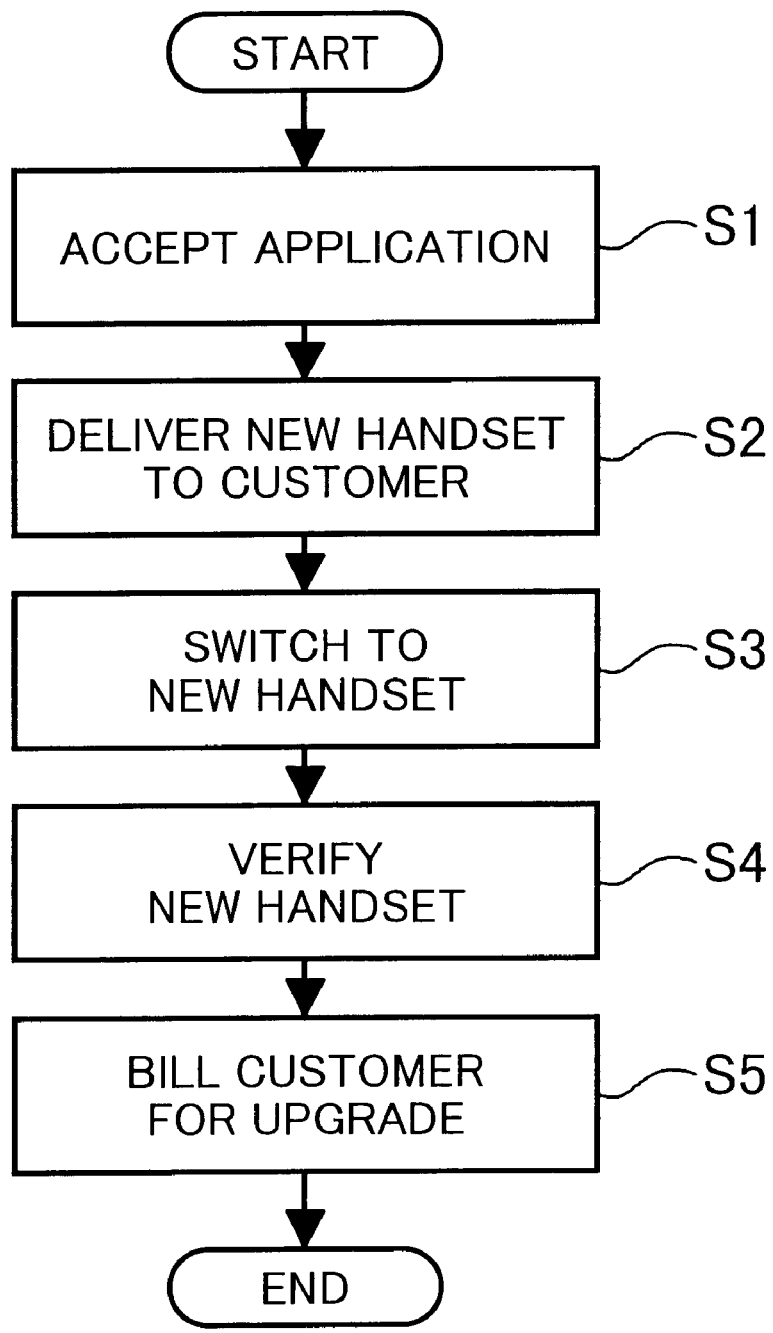
FIG. 3 is a general flowchart which shows an overall process of upgrading a mobile handset.

Referring now to the flowchart of FIG. 3, the entire process of handset upgrading, from application to billing, will be described. The proposed system first receives an application from a customer who wishes an upgrade (step S1). At this step, the customer is prompted to enter some information that proves his/her authenticity as the owner, or authorized user, of the current handset. The handset updating system supplies an application filing number back to the applicant which is not known to any other persons. The cellular service provider delivers the desired new handset to the requesting customer (step S2). At this step, the customer receives an upgrade password which is known only to him/her and the system.

Subsequently, the customer sends an instruction from his/her current handset, requesting the system to execute switchover to the new handset (step S3). This step requires the customer to enter the application filing number and upgrade password, thereby preventing the received new handset from being enabled by any other person. After that, using a mail server and IVP facilities, the system verifies its new setup and the fundamental functions of the new handset (step S4). If any problem was found in the new configuration of the system, or in the functions of the new handset, the system would restore the previous setup. When everything is verified, the system bills the customer for the new handset, including the upgrade service charge and any other dues (step S5). The customer can choose the payment method previously at the time of application. In the case he/she chooses paying by money transfer, the system will enclose a debit note in the package of the new handset at step S2. Or he/she may wish a cash on delivery (COD) order, in which case the system makes necessary arrangements so that the money will be collected by a delivery person.

Figure 4:
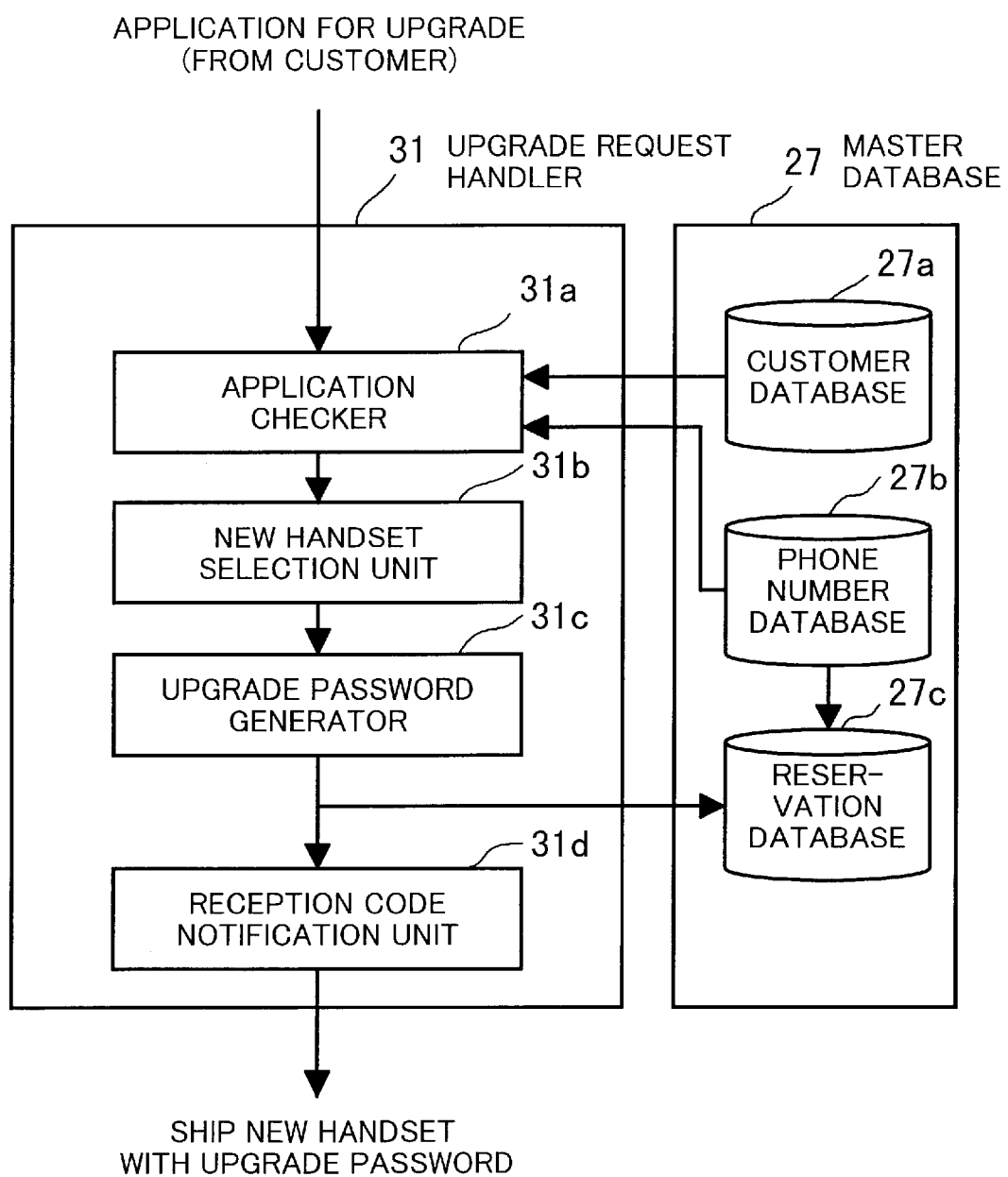
FIG. 4 shows the structure of an upgrade request handler.

The following section will provide the details of the step S1 of accepting an application. The proposed system employs an upgrade request handler 31 shown in FIG. 4, which is actually implemented as a computer program and is stored in the HDD 26d.

The upgrade request handler 31 comprises an application checker 31a, a new handset selection unit 31b, an upgrade password generator 31c, and a reception code notification unit 31d. The application checker 31a is coupled with a master database 27 which comprises a customer database 27a, a phone number database 27b, and a reservation database 27c.

The application checker 31a receives an application for an upgrade from a cellular customer and compares each entered data item with the relevant record in the customer database 27a and phone number database 27b to check whether the application is valid in its entirety. The new handset selection unit 31b provides a list of available mobile handsets, allowing the customer to specify a desired one. The upgrade password generator 31c produces an upgrade password and an application filing number, when the details of the application have been validated and the customer has specified his/her desired type of handset. The reception code notification unit 31d notifies the customer of the application filing number. As noted earlier, the application filing number is known only to the applicant, and the upgrade password to the recipient of the new handset.

The above-described upgrade request handler 31 operates as follows. When a handset upgrade request is received, the application checker 31a checks the validity of the application details by consulting the customer database 27a and phone number database 27b, where the phone number database 27b contains at least the phone numbers and MSINs of cellular customers. When they are successfully validated, the new handset selection unit 31b prompts the customer to decide which handset to choose and what optional services to select. After that, the upgrade password generator 31c produces an upgrade password and an application filing number. It then compiles a reservation record from the relevant part of the customer database 27a and phone number database 27b which has just been used to validate the application. This record is saved into the reservation database 27c for later reference. Finally, the reception code notification unit 31d sends the upgrade password to the applicant, while forwarding the information about the selected handset type to the distribution department of the cellular service provider, along with the upgrade password for later delivery to the customer.

Figure 5:
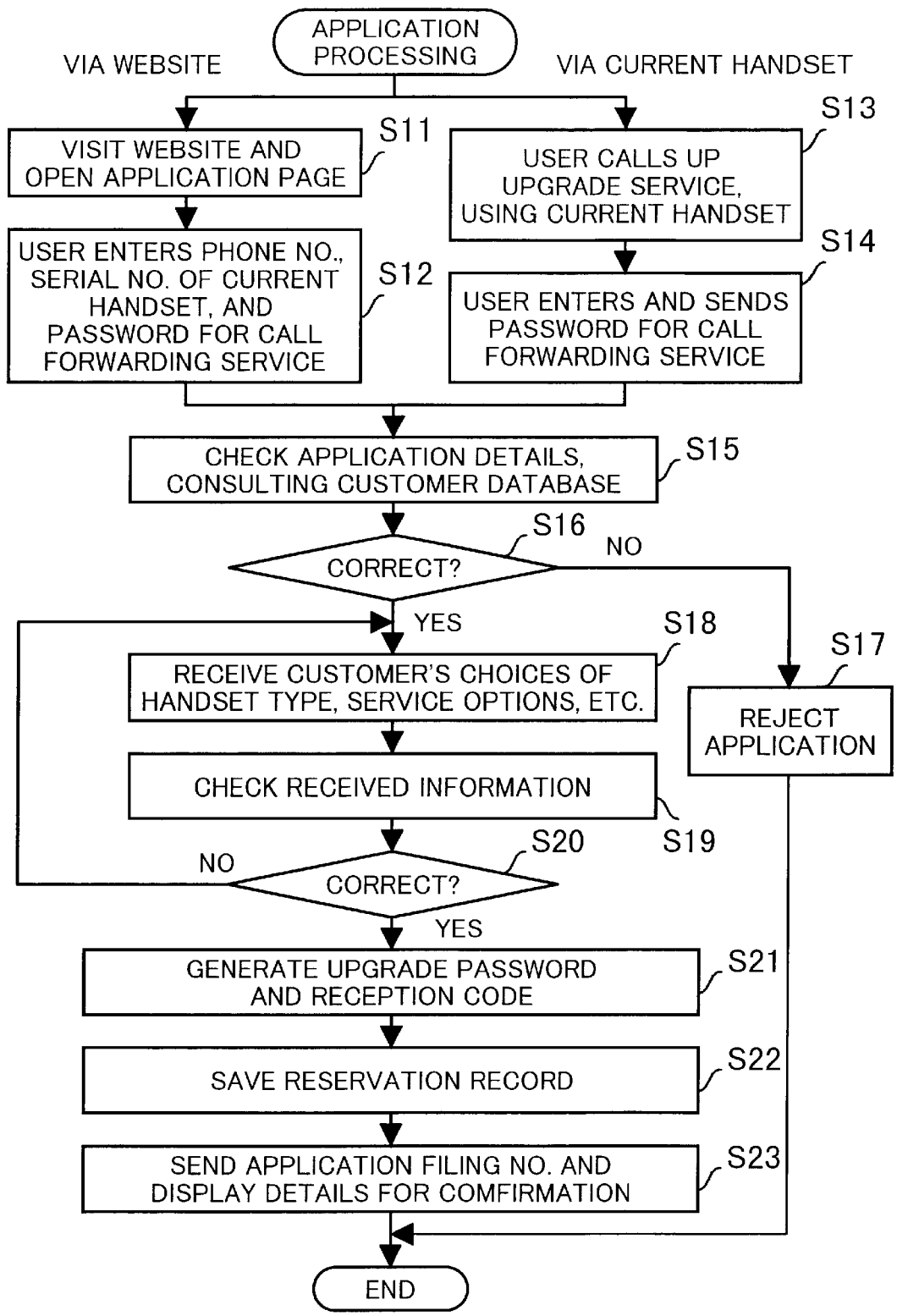
FIG. 5 is a flowchart which shows a process of accepting an application for handset upgrading.

Referring to the flowchart of FIG. 5, the application acceptance procedure, involving interaction with the customer, is described. Here, the applicant for an upgrade has two options: (a) visit the website of his/her service provider, using a personal computer or other portable data equipment, and make application on a dedicated web page; or (b) call up the provider's handset upgrading service by using his/her current mobile handset. In either way, the customer can make application online, as in the Internet shopping, without visiting a local retail store.

With the first application method (a), the customer goes to a web page designed for the application for an upgrade, following an appropriate link found in the homepage of the cellular service provider (step S11). The customer fills out the application form on the page, entering the phone number, the serial number of the handset hardware, and his/her password for call forwarding service (step S12). By giving such peculiar information, the customer claims that he/she is the owner of an old-type handset. Note that the password for call forwarding service serves as the key information to authenticate the customer, since it was originally defined by the customer himself/herself. The serial number is usually printed on the rear cover of a handset, meaning that it is accessible to no one but the owner. The combined use of the handset's serial number and the customer's call forwarding password ensures reliable authentication processing in the proposed system. It would not be possible to upgrade a stolen handset, because its associated password is unknown to that non-eligible applicant.

With the second application method (b), the customer selects handset upgrade service from among those offered by the cellular service provider, using his/her current handset (step S13). During the call, the service provider can make access to the network data to obtain the necessary information (e.g., phone number and MSIN) for identifying which handset is being used. For this reason, the customer has only to enter his/her password for call forwarding service (step S14), unlike the case of method (a), which requires more information to enter.

Subsequently to step S12 or S14, the service provider consults the customer database, using the given information as search keywords, thereby validating the application (step S15). That is, the proposed system first searches the customer database for a record corresponding to the requesting customer's phone number. In the case of the application method (a), the system then performs user authentication by comparing the serial number and the customer's call forwarding password with the database record. As for the application method (b), the system authenticates the customer by comparing the MSIN and the customer's call forwarding password with the database record. It is then tested whether the given combination of data items is correct (step S16). If the application includes any discrepancies, the system rejects the request (step S17). In this way, the proposed system permits customers to apply for an upgrade without visiting a telephone store to demonstrate their authenticity in person, which the conventional systems do require.

Referring to FIG. 6, the customer database 27a maintains the subscriber code, phone number, serial number, service status, password for call forwarding service, and other related information. The upgrade request handler 31 scans this customer database 27a by using a given telephone number as the search keyword, thereby obtaining its associated serial number and call forwarding password.

Referring back to FIG. 5, if the application is successfully validated, then the customer chooses a desired handset from among those listed on the web page or the display screen of the current handset. The new handset may support new optional service features. If this is the case, the customer decides which services to subscribe to and enters necessary parameters for them, which are transmitted to the cellular service provider (step S18). The provider's system then checks the received information (step S19). If any discrepancies are found, the system prompts the customer to correct the error or re-enter the item. Otherwise, the system accepts the application from the customer (step S20) and now generates an upgrade password and an application filing number (step S21). After that, the system records the details of the application in the reservation database 27c (step S22). The application filing number and other details are also transmitted to the applicant, asking him/her to take a note of that filing number for future use (step S23).

FIG. 7 shows the reservation database 27c mentioned above at step S22, which comprises the following information fields: application filing number, subscriber code, phone number, old MSIN, new MSIN, password, serial number, completion date, and others. This database 27c is used to manage the progress of ongoing upgrade processes, as well as to maintain the upgrade passwords and application filing numbers for authentication purposes. The subscriber code, phone number, and old and new MSINs are obtained by consulting the customer database 27a, making access to the network data, or searching the phone number database 27b, which manages the relationship between phone numbers and MSINs. The new MSIN and serial number fields indicate which type of handset each customer has chosen. The password field stores upgrade passwords generated by the system. The serial number of a new handset 22 is determined, for example, when the reservation data record is created, or when the service provider programs its ROM.

When the application is accepted through the above-described processing, the service provider begins preparations for shipment of the ordered new handset, as well as printing out an invoice which includes the generated upgrade password. Those things are delivered together to the requesting customer, the destination being the same as the billing address that has previously been registered in the customer's service account.

According to the present invention, the system acquires such information as which services to subscribe to and whether to change the phone number, when preparing a new handset that the customer specified at the time of application. Since all necessary information is at hand, the service provider writes setup data into ROM before shipment. Therefore, the customer can receive a new handset that is fully configured with appropriate ROM contents, without the need for visiting a local telephone store.

In the application procedure, the customer can specify a desired payment method (e.g., money transfer, COD) to pay the cost of a new handset and the upgrade fee. In the case money transfer is selected for payment, the system encloses a debit note in the package of the new handset. When he/she wish to pay cash on delivery, the system passes a debit note to the delivery agent.

Suppose here that the new handset has delivered to the applicant, together with an invoice, allowing him/her to proceed to the next step of the upgrading procedure. More specifically, the system executes a program for configuring the network so that the new handset will be operable. Referring to the flowchart of FIG. 8, the details of this handset switchover processing will be described below.

The customer first calls up the handset upgrade service that is offered by the cellular service provider, using his/her current mobile handset. Typically, this is performed by selecting a relevant item from the provider's service menu. In response to the selection, the system invokes an appropriate program to provide the specified service. When the upgrade service starts, the customer is prompted to enter the previously supplied application filing number, as well as the upgrade password printed on the invoice. The system receives those pieces of information from the customer (step S31), and based on the application filing number, it then searches the reservation database 27c (step S32). The program subsequently determines whether a record relevant to the particular application filing number is found in the reservation database 27c (step S33). If no such a record is found, or if the record found in the reservation database 27c indicates that the upgrade has already finished, the system returns to the customer an error message saying "No such reservation record" (step S34).

If a relevant database record is found, then the program compares the given upgrade password with a corresponding value in the record, thereby verifying its validity (step S35). If they do not agree with each other, the program sends an error message "Incorrect password" back to the customer (step S36). Through the above steps S33 and S35 of checking, the system recognizes the requesting customer as being the very person who made application and received the new handset package.

For the next step, the system obtains the customer's phone number, and in an attempt to identify which handset is currently used, it makes access to network data that is available only to the cellular service provider (step S37). That is, the system determines whether the requesting customer is using his/her old handset, by checking, for example, its MSIN. Since it is not possible for any cellular user to change the MSIN of his/her mobile phone, the system can attain the above objective with a high level of security. Should the application filing number or upgrade password be leaked to someone, the system would not take that person as legitimate unless he/she has the old-type handset at hand.

The reservation database 27c holds the true MSIN and phone number in a record that was entered at the time of application. The system compares the values supplied at step S37 with those in the relevant record in the reservation database 27c, thereby determining whether they are correct (step S38). If any discrepancy is found, the system sends an error message to the customer, saying "You are using a wrong handset. Try again with the handset that you intend to upgrade" (step S39). If the given MSIN and phone number are correct, the system prompts the customer to make a final determination of whether to execute the upgrade (step S40), and the customer responds to it (step S41).

If a negative answer is returned at step S41, the system cancels the current processing (step S42). If the answer is positive, the system issues two commands to the telephone exchange 30 according to the record in the reservation database 27c, so as to deregister the current handset, and to register the new handset (step S43). The telephone exchange 30 executes these two commands. When the former operation is successfully finished in the telephone exchange 30, the old handset can no longer be used in the cellular network. When the latter operation is successfully finished, the new handset gains connectivity in the network.

Typically, the above two switching operations are performed synchronously under the control of a certain mechanism in the telephone exchange 30, thus ending up with a result of either "both successful" or "neither successful." The latter result may be brought about by a problem in the telephone exchange or a defect in the new handset. According to the present invention, the upgrading procedure involves the step of functional verification after the above-described switchover operation is done. More specifically, the system sends an e-mail message that notifies the customer of the completion of the switchover operation and requests him/her to returns a reply message for acknowledgment (step S44). This e-mail message will test the following points: (1) whether the telephone exchange has successfully finished the switchover operation to the new handset; (2) whether the mail sending function of the telephone exchange operates correctly with the new setup; and (3) whether the new handset can receive e-mail correctly. After sending the message, the system enters the completion date to the reservation database 27c for progress management purposes (step S45). The reservation record updated as such is shown in FIG. 9.

Figure 8:
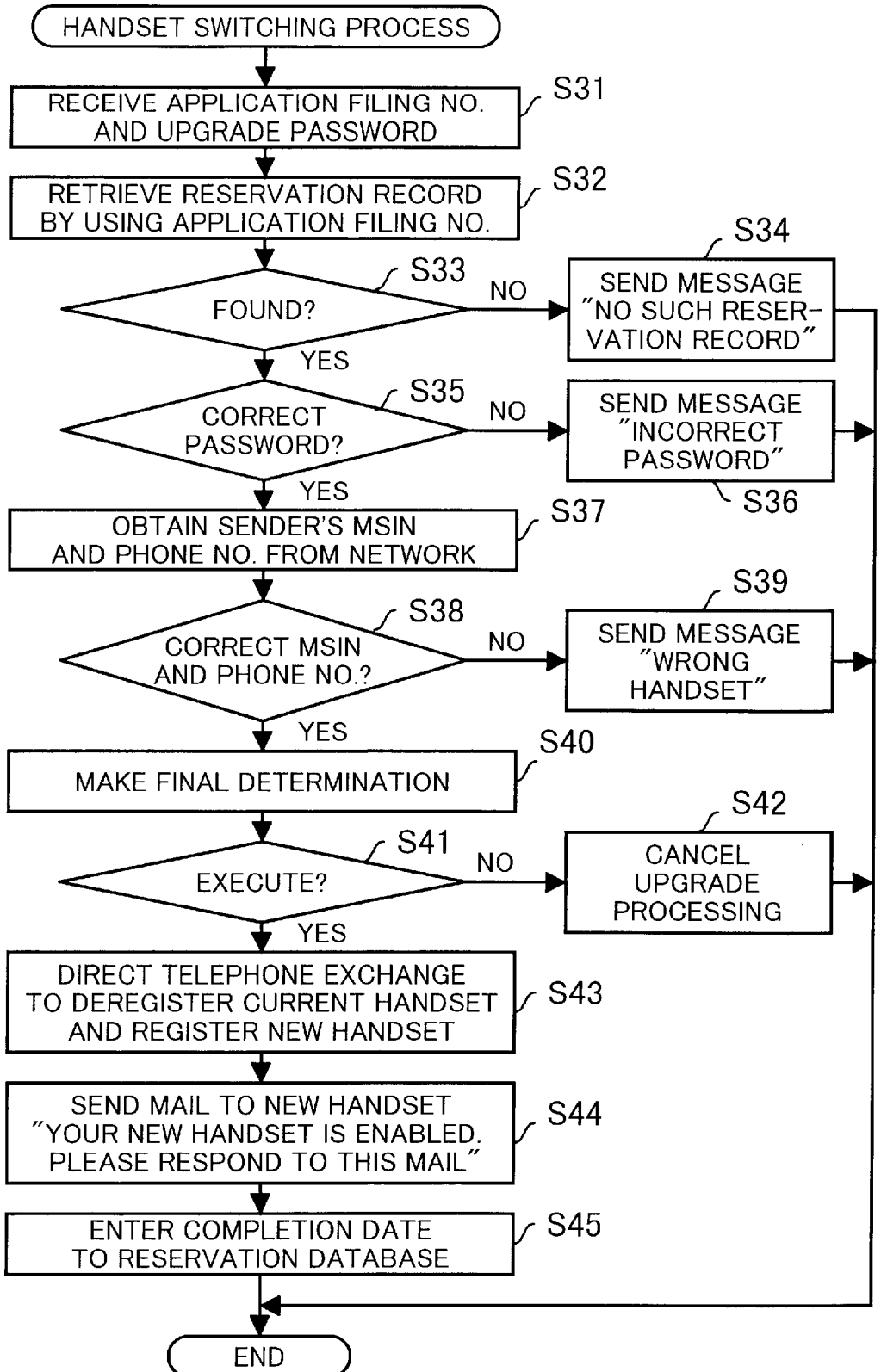
FIG. 8 is a flowchart which shows a process of switching to a new handset.
Figure 10:
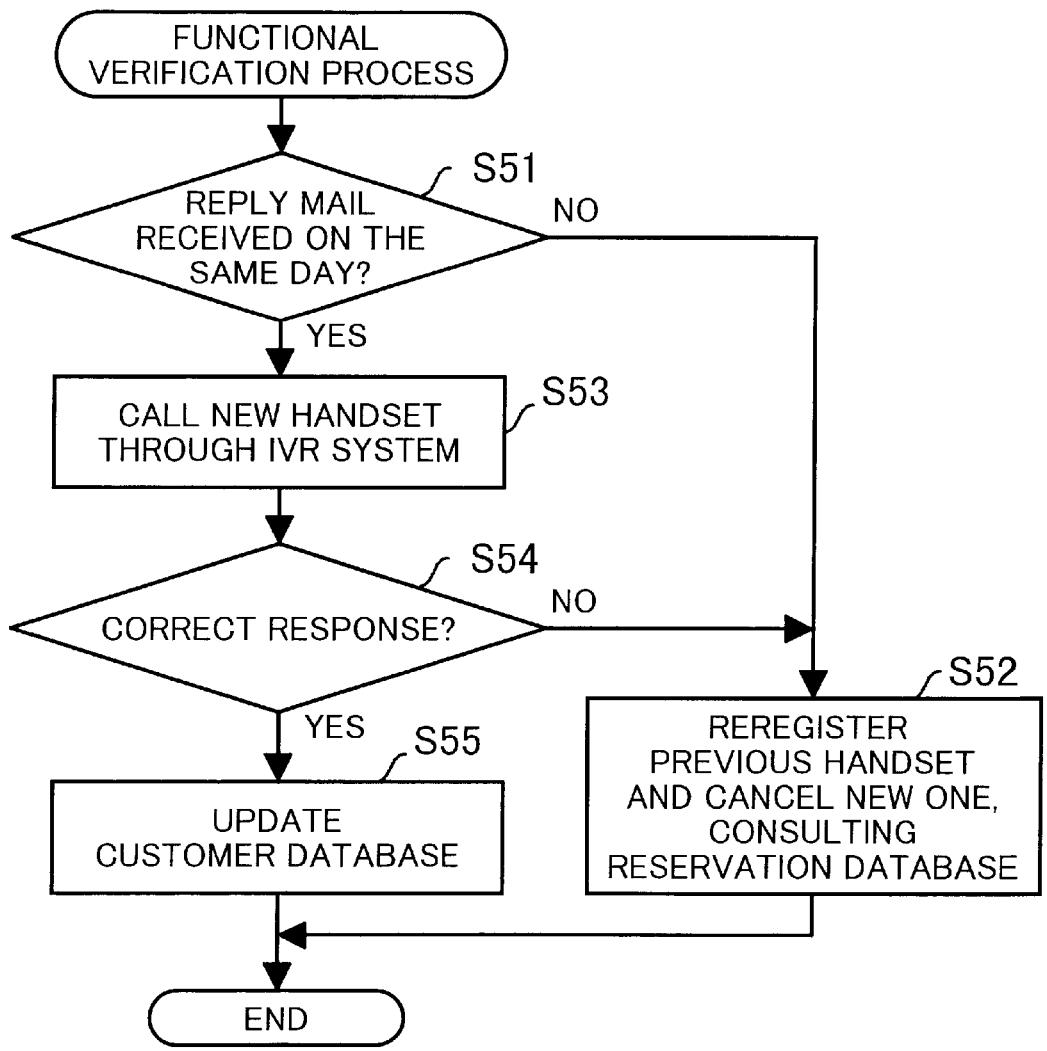
FIG. 10 is a flowchart which shows a process of verifying the result of handset upgrading.

Subsequently to the handset switchover processing of FIG. 8, the response to the above-described message is examined in a functional verification process shown in the flowchart of FIG. 10. First, the system determines whether any message has been received from the new handset 22 on the same day as the confirmation message was transmitted (step S51). If there was no reply message, the system restores the previous setup by reregister the old handset 21 while canceling the new handset 22, consulting the reservation database 27c (step S52). If, on the other hand, there was a reply message, the system calls up the new handset 22 and sends a voice message to the customer through the IVR system 29 (step S53). This message may be "Do you hear us? If so, please press the button '1'," for example. The system then examines how the customer responds (step S54). If there is no response, or if an unexpected answer (i.e., other than '1') is returned, the system proceeds to step S52, taking it as evidence of trouble in the voice channel.

Upon receipt of a correct acknowledgment (i.e., '1') from the customer, the system determines that the switchover to the new handset has been successfully completed and both the voice and mail functions of the new handset are working properly. Accordingly, the system updates its customer database 27a (step S55) with the serial number of the new handset which is obtained from the reservation database 27c. The resultant record of the customer database 27a is shown in FIG. 11. Although it is not depicted, the reservation database 27c is also updated with the completion date of the verification test.

Figure 12:
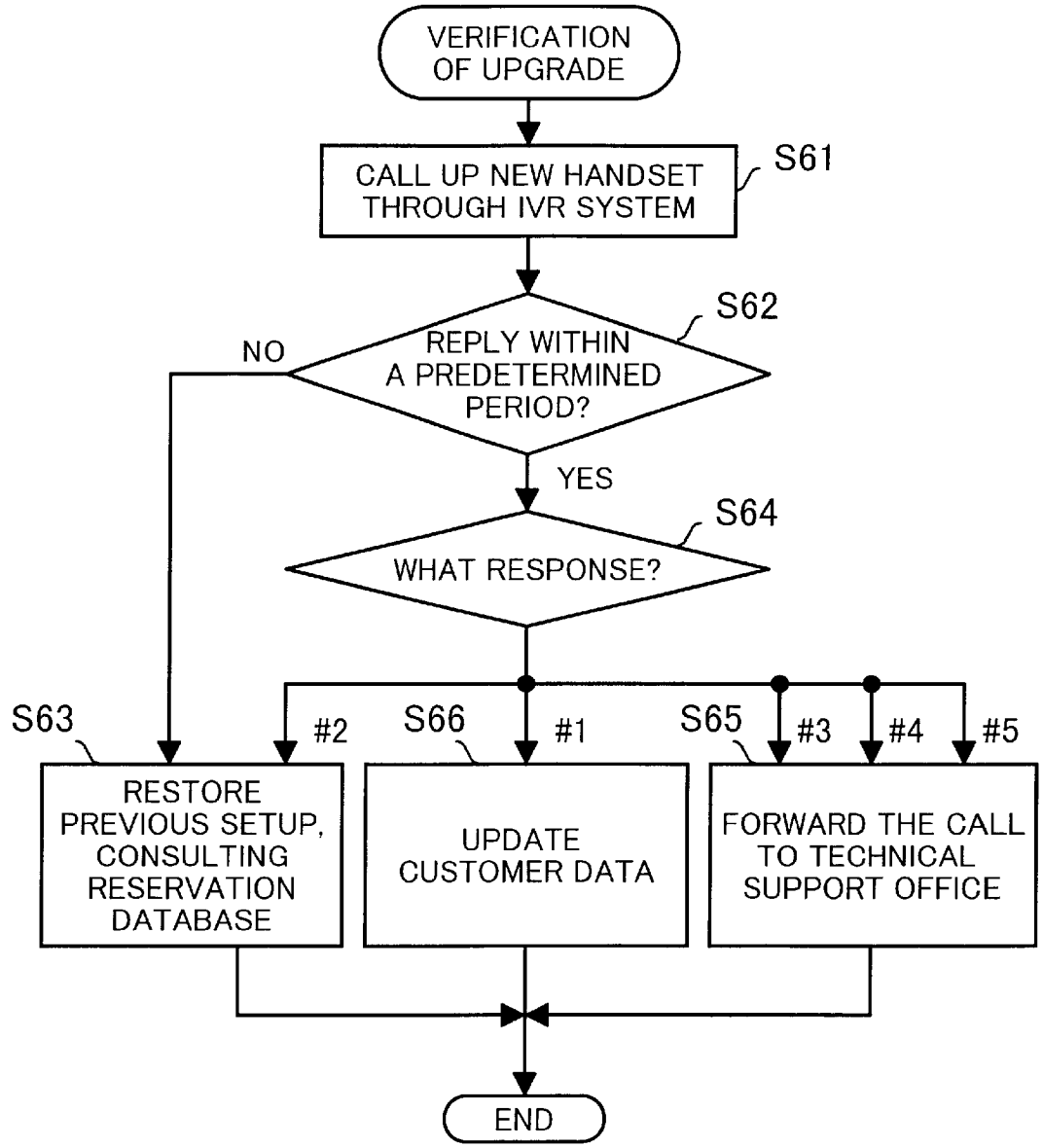
FIG. 12 is a flowchart which shows another process of verifying the result of handset upgrading.

Referring to the flowchart of FIG. 12, another method of functional verification will be described below. In this alternate method, the system sends a different message to the new handset 22 at step S44 of FIG. 8, expressing a gratitude to the customer and simply reporting the completion of upgrade processing. Instead of requesting a reply mail, the system makes a call to the new handset 22, using the automated function of the IVR system 29 (step S61). More specifically, a voice message "Did you receive an e-mail message from us?" is sent from the IVR system 29, and the customer responds to it by pressing an appropriate numeric key, depending on the situation. The system provides the following options for an answer:

(#1) Yes, I received the message.
(#2) No, there is no such mail.
(#3) No such mail, but I like this handset.
(#4) The message arrived at my old handset.
(#5) Please connect me to the support office.

The system then observes the response from the customer (step S62). If the call from the IVR system 29 does not reach the new handset 22, or if no reply is returned within a predetermined period, the system determines that the new handset 22 has some problem, thus directing the telephone exchange 30 to restore the previous setup (step S63). That is, it cancels the new handset and reregisters the handset that has previously been used. At the same time, the handset upgrading system notifies the system operator of the unsuccessful switchover via e-mail or any other means. The operator then tries to solve the problem, making a call to the customer's previous handset.

When an answer from the customer is received within the predefined period, the system then determines which type of answer it is (step S64). The answer #1 ("Yes, I received the message") suggests that the voice channel between the new handset 22 and IVR system 29 is working fine. This indicates the successful completion of switching to the new handset 22, as well as showing good health of its voice functions. The answer #1 also suggests that the mail function of the new handset 22 is operating correctly since it eventually acknowledges the reception of the greeting message from the system. Accordingly, the system records the normal end of the upgrading process in the reservation database 27c and updates the customer database 27a with the parameters of the new handset (step S65).

The answer #2 ("No, there is no such mail") leads the program to step S63, where the previous system setup will be restored because the answer #2 suggests that the voice functions are working, but the e-mail functions are not. When the answer #3 ("No such mail, but I like this handset") is returned, the system forwards the call to the service provider's technical support office (step S66) to let the staff address the problem. The system reacts in the same way to the answer #4 ("The message arrived at my old handset") since it implies unsuccessful switchover to the new handset (step S66). In the case of answer #5 ("Please connect me to the support office"), the system simply forwards the call to the technical support office as requested by the customer (step S66). As seen from the above, the proposed system is designed to automatically take appropriate measures when the customer's answer implies some problem in the new setup (except for the case of answer #5).

The above section has described two methods for verifying the result of handset upgrading. In both cases, the handset upgrading system exploits the IVR system 29 to perform an automated interactive verification. The system employs a mechanism for testing whether the new handset 22 is reachable, receiving the customer's response to a query from the IVR system 29, and automatically determining how to handle it. This mechanism eliminates the need for the cellular customers to have their new handset tested at the store where they purchased it.

The handset upgrading process is now coming to an end with the collection of money from the customer. As previously mentioned, the customer can specify the desired payment method at the time of application. The customer may choose "money transfer" or "cash on delivery" for it. If no specific method is designated, the system will include the upgrade fee and other charges in the subscription account of the customer, which is billed for typically on a monthly basis.

The process steps of the proposed handset upgrading system are encoded in a computer program, which will be stored in a computer-readable storage medium. The computer system executes this program to provide the intended functions of the present invention. Suitable computer-readable storage media include magnetic storage media and solid state memory devices. Other portable storage media, such as CD-ROMs and floppy disks, are also suitable, particularly for circulation purposes. Further, it will be possible to distribute the programs through an appropriate server computer deployed on a network. The program files delivered to a user are normally installed in his/her computer's hard drive or other local mass storage devices, which will be executed after being loaded to the main memory.

The above discussion will now be summarized as follows. According to the present invention, the handset upgrading system provides a fully automated mechanism for: (a) accepting an online application for an upgrade, (b) validating a handset upgrade request by verifying whether the customer is sending it with his/her current handset, (c) directing the telephone exchange to activate the new handset, (d) testing mail and voice functions, and (e) updating the customer database. The above features permits the customers to upgrade their handset by themselves at whatever place, without the need for visiting a sales counter. The system requires customers to use their current handset when sending a handset upgrade request, thus making it possible to automate the authentication process. Besides, this requirement effectively protects the system against spoofing attacks. Further, an upgrade password is delivered to the applicant, together with a new handset that he/she ordered, and the system requires the applicant to enter that password to execute the upgrade. Functional verification of a new handset is also automated through the use of mail and IVR facilities, which alleviates the service provider's workload. The proposed handset upgrading system permits cellular service providers to sell their services directly to customers, eliminating the commissions of middlemen, and thus helps them strengthen their business.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A handset upgrading system that executes a handset upgrade from a first mobile handset to a second mobile handset for use in a cellular network, comprising:

upgrade request validation means for validating a handset upgrade request received from a customer by verifying that the customer is an applicant who applied online for the handset upgrade, as well as that the customer is currently using the first mobile handset to interact with the handset upgrading system, the verification being performed by comparing given information with a reservation record created and saved when the application was made, the given information including an application filing number which was generated and supplied to the applicant when the application was made, a password which was delivered to the applicant, together with the second mobile handset, and an identification number of the mobile handset that the customer is currently using, which is retrieved from the cellular network; and switchover commanding means for commanding a telephone exchange to deregister the first mobile handset and register the second mobile handset when said upgrade request validation means has successfully validated the handset upgrade request.

2. The handset upgrading system according to claim 1, further comprising:

functional verification means for verifying functions that the second mobile handset is supposed to provide; and another switchover commanding means for commanding the telephone exchange to deregister the second mobile handset and reregister the first mobile handset when said functional verification means has found a problem with the functions of the second mobile handset.

3. The handset upgrading system according to claim 2, wherein said functional verification means comprises:
   mail function verification means for verifying mail functions of the second mobile handset by sending an e-mail message to the second mobile handset via a mail server and receiving a reply message from the customer; and
   voice function verification means for verifying voice functions of the second mobile handset by sending a voice message to the second mobile handset via an interactive voice response system and receiving a response from the customer.

4. The handset upgrading system according to claim 3, wherein said mail function verification means determines that the second mobile handset has a problem when no reply message is returned from the customer within a predetermined period.

5. The handset upgrading system according to claim 3, wherein said voice function verification means determines that the second mobile handset has a problem when no response is returned from the customer within a predetermined period.

6. The handset upgrading system according to claim 3, wherein said voice function verification means determines that the second mobile handset has a problem when the response returned from the customer is different from what has been expected.

7. The handset upgrading system according to claim 2, wherein said functional verification means comprises:
   mail sending means for sending an e-mail message to the second mobile handset via a mail server; and
   voice function verification means for sending a voice message to the second mobile handset via an interactive voice response system to ask whether the e-mail message has arrived from the mail sending means, and determining that the second mobile handset is functioning correctly, when a positive response to the voice message is received from the customer.

8. A method of executing a handset upgrade from a first mobile handset to a second mobile handset for use in a cellular network, comprising:
   validating a handset upgrade request received from a customer by verifying that the customer is an applicant who applied online for the handset upgrade, as well as that the customer is currently using the first mobile handset in an attempt to execute the handset upgrade, the verification being performed by comparing given information with a reservation record created and saved when the application was made, the given information including
      an application filing number that was generated and supplied to the applicant when the application was made,
      a password that was delivered to the applicant, together with the second mobile handset, and
      an identification number of the mobile handset that the customer is currently using, which is retrieved from the cellular network;
   commanding a telephone exchange to deregister the first mobile handset and register the second mobile handset when said validating a handset upgrade request has successfully validated the handset upgrade request;
   verifying functions that the second mobile handset is supposed to provide; and
   commanding the telephone exchange to deregister the second mobile handset and reregister the first mobile handset when a problem with the functions of the second mobile handset is found at said verifying functions that the second mobile handset is supposed to provide.

9. A computer-readable medium storing a program which executes a handset upgrade from a first mobile handset to a second mobile handset for use in a cellular network, the program causing a computer system to function as:
   upgrade request validation means for validating a handset upgrade request received from a customer by verifying that the customer is an applicant who applied online for the handset upgrade, as well as that the customer is currently using the first mobile handset in an attempt to execute the handset upgrade, the verification being performed by comparing given information with a reservation record created and saved when the application was made, the given information including
      an application filing number that was generated and supplied to the applicant when the application was made,
      a password that was delivered to the applicant, together with the second mobile handset, and
      an identification number of the mobile handset that the customer is currently using, which is retrieved from the cellular network;
   first switchover commanding means for commanding a telephone exchange to deregister the first mobile handset and register the second mobile handset when said upgrade request validation means has successfully validated the handset upgrade request;
   functional verification means for verifying functions that the second mobile handset is supposed to provide; and
   second switchover commanding means for commanding the telephone exchange to deregister the second mobile handset and reregister the first mobile handset when a problem with the functions of the second mobile handset is found by said functional verification means.

10. A handset upgrading system that executes a handset upgrade from a first mobile handset to a second mobile handset for use in a cellular network, comprising:
    an upgrade request validation unit validating a handset upgrade request received from a customer by verifying that the customer is an applicant who applied online for the handset upgrade, and that the customer is currently using the first mobile handset to interact with the handset upgrading system, the verification being performed by comparing given information with a reservation record created and saved when the application was made, the given information including
       an application filing number which was generated and supplied to the applicant when the application was made,
       a password which was delivered to the applicant, together with the second mobile handset, and
       an identification number of the mobile handset that the customer is currently using, which is retrieved from the cellular network; and
    a switchover commanding unit commanding a telephone exchange to deregister the first mobile handset and register the second mobile handset when the upgrade request validation unit has successfully validated the handset upgrade request.

11. A computer-readable storage controlling a computer to execute a handset upgrade from a first mobile handset to a second mobile handset for use in a cellular network, and comprising a process of:

receiving an application filing number that is generated and supplied to an applicant when the applicant applies for the handset upgrade;

receiving a password that is provided to the applicant along with the second mobile handset;

receiving an identification number of a mobile handset being used by a customer, which is retrieved from the cellular network;

validating a handset upgrade request received from the customer by verifying that the customer is the applicant who applied online for the handset upgrade, and that the customer is currently using the first mobile handset in an attempt to execute the handset upgrade, the verification being performed by comparing the application filing number, the password, and the identification number with a reservation record created and saved when the application was made;

commanding a telephone exchange to deregister the first mobile handset and register the second mobile handset when the handset upgrade request has been successfully validated;

verifying functionality of the second mobile handset; and commanding the telephone exchange to deregister the second mobile handset and reregister the first mobile handset when the second mobile handset does not function properly.

* * * * *